United States Patent
Li et al.

(10) Patent No.: US 10,952,064 B2
(45) Date of Patent: Mar. 16, 2021

(54) REMOTE PROVISION OF A SUBSCRIBER ENTITY

(71) Applicant: Telefonaktiebolaget LM Ericsson (publ), Stockholm (SE)

(72) Inventors: Qiang Li, Täby (SE); Thomas Bergenwall, Espoo (FI); Tomas Holm, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 16/305,750

(22) PCT Filed: Jun. 1, 2016

(86) PCT No.: PCT/EP2016/062342
§ 371 (c)(1),
(2) Date: Nov. 29, 2018

(87) PCT Pub. No.: WO2017/207043
PCT Pub. Date: Dec. 7, 2017

(65) Prior Publication Data
US 2020/0304986 A1  Sep. 24, 2020

(51) Int. Cl.
*H04W 8/20* (2009.01)
*H04W 8/24* (2009.01)
*H04W 8/18* (2009.01)
*H04W 48/06* (2009.01)
*H04W 48/16* (2009.01)
*H04W 48/18* (2009.01)
*H04W 68/00* (2009.01)
(Continued)

(52) U.S. Cl.
CPC ............. *H04W 8/20* (2013.01); *H04W 48/06* (2013.01); *H04W 48/16* (2013.01); *H04W 48/18* (2013.01); *H04W 68/005* (2013.01); *H04W 84/042* (2013.01)

(58) Field of Classification Search
CPC ..... H04W 8/20; H04W 68/005; H04W 48/18; H04W 48/06; H04W 48/16; H04W 84/042
USPC ........................................................ 455/421
See application file for complete search history.

(56) References Cited

U.S. PATENT DOCUMENTS

2012/0243467 A1  9/2012 Vallurupalli et al.
2015/0304506 A1  10/2015 Zhu et al.
(Continued)

FOREIGN PATENT DOCUMENTS

EP  2925032 A1  9/2015
EP  2955947 A1  12/2015

*Primary Examiner* — Inder P Mehra
(74) *Attorney, Agent, or Firm* — Sage Patent Group

(57) ABSTRACT

There is provided mechanisms for remote provision of a subscriber entity to a PLMN in a communications network. A method is performed by the subscriber entity. The method comprises obtaining a first list of PLMN IDs in the communications network for which a signal quality criterion is fulfilled. The method comprises providing the first list of PLMN IDs and eUICC ID of the subscriber entity to a network server. The method comprises receiving a third list of PLMN IDs from the network server, wherein the third list of PLMN IDs is based on the first list of PLMN IDs. The method comprises selecting, when the third list of PLMN IDs is a non-empty list, one PLMN from the third list of PLMN IDs to remotely provision the subscriber entity.

7 Claims, 5 Drawing Sheets

(51) Int. Cl.
*H04W 84/04* (2009.01)
*H04W 4/02* (2018.01)

(56) References Cited

U.S. PATENT DOCUMENTS

2015/0382178 A1    12/2015  Park et al.
2017/0280340 A1*    9/2017  Zhu ..................... H04W 24/04

* cited by examiner

REMOTE PROVISION OF A SUBSCRIBER ENTITY

TECHNICAL FIELD

Embodiments presented herein relate to methods, a subscriber entity, computer programs, and a computer program product for remote provision of the subscriber entity. Embodiments presented herein further relate to methods, a network server, computer programs, and a computer program product for enabling remote provision of a subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, which are used to identify and authenticate subscribers on the devices. The SIM circuit is part of the function of a Universal Integrated Circuit Card (UICC) physical smart card. Traditional SIM cards are predicated on only associating with one network operator.

The GSMA specifies an embedded SIM service. Further, OEMs are providing managed connectivity by embedding the connectivity into the device, using a "blank" eSIM, and then depending on where (in which country) the device is sold, the device/eSIM can be finally localized to a local operator in that country. Here, localization involves the device entering a new country from its home/manufacture country to localize its eSIM profile to be the local operator profile, so that the device is attached by the localized eSIM profile to the local operator network, in order to meet local regulatory/commercial requirements.

Hence, there is still a need for improved localization of a subscriber entity.

SUMMARY

An object of embodiments herein is to provide efficient localization of a subscriber entity.

According to a first aspect there is presented a method for remote provision of a subscriber entity to a PLMN in a communications network. The method is performed by the subscriber entity. The method comprises obtaining a first list of PLMN IDs in the communications network for which a signal quality criterion is fulfilled. The method comprises providing the first list of PLMN IDs and eUICC ID of the subscriber entity to a network server. The method comprises receiving a third list of PLMN IDs from the network server, wherein the third list of PLMN IDs is based on the first list of PLMN IDs. The method comprises selecting, when the third list of PLMN IDs is a non-empty list, one PLMN from the third list of PLMN IDs to remotely provision the subscriber entity.

According to a second aspect there is presented a subscriber entity configured for remote provision of the subscriber entity to a PLMN in a communications network. The subscriber entity comprises processing circuitry. The processing circuitry is configured to cause the subscriber entity to obtain a first list of PLMN IDs in the communications network for which a signal quality criterion is fulfilled. The processing circuitry is configured to cause the subscriber entity to provide the first list of PLMN IDs and eUICC ID of the subscriber entity to a network server. The processing circuitry is configured to cause the subscriber entity to receive a third list of PLMN IDs from the network server, wherein the third list of PLMN IDs is based on the first list of PLMN IDs. The processing circuitry is configured to cause the subscriber entity to select, when the third list of PLMN IDs is a non-empty list, one PLMN from the third list of PLMN IDs to remotely provision the subscriber entity.

According to a third aspect there is presented a subscriber entity configured for remote provision of the subscriber entity to a PLMN in a communications network. The subscriber entity comprises processing circuitry and a computer program product. The computer program product stores instructions that, when executed by the processing circuitry, cause the subscriber entity to perform steps, or operations. The steps, or operations, cause the subscriber entity to obtain a first list of PLMN IDs in the communications network for which a signal quality criterion is fulfilled. The steps, or operations, cause the subscriber entity to provide the first list of PLMN IDs and eUICC ID of the subscriber entity to a network server. The steps, or operations, cause the subscriber entity to receive a third list of PLMN IDs from the network server, wherein the third list of PLMN IDs is based on the first list of PLMN IDs. The steps, or operations, cause the subscriber entity to select, when the third list of PLMN IDs is a non-empty list, one PLMN from the third list of PLMN IDs to remotely provision the subscriber entity.

According to a fourth aspect there is presented subscriber entity configured for remote provision of the subscriber entity to a PLMN in a communications network. The subscriber entity comprises an obtain module configured to obtain a first list of PLMN IDs in the communications network for which a signal quality criterion is fulfilled. The subscriber entity comprises a provide module configured to provide the first list of PLMN IDs and eUICC ID of the subscriber entity to a network server. The subscriber entity comprises a receive module configured to receive a third list of PLMN IDs from the network server, wherein the third list of PLMN IDs is based on the first list of PLMN IDs. The subscriber entity comprises a select module configured to select, when the third list of PLMN IDs is a non-empty list, one PLMN from the third list of PLMN IDs to remotely provision the subscriber entity.

According to a fifth aspect there is presented a computer program for remote provision of a subscriber entity to a PLMN in a communications network, the computer program comprising computer program code which, when run on processing circuitry of the subscriber entity, causes the subscriber entity to perform a method according to the first aspect.

According to a sixth aspect there is presented a method for enabling remote provision of a subscriber entity to a PLMN in a communications network. The method is performed by a network server. The method comprises receiving (S202), from the subscriber entity, a first list of PLMN IDs in the communications network for which a signal quality criterion is fulfilled for the subscriber entity and a eUICC ID of the subscriber entity. The method comprises determining a second list of PLMN IDs based on the eUICC ID of the subscriber entity. The method comprises determining a third list of PLMN IDs consisting of those PLMN IDs the first list of PLMN IDs and the second list of PLMN IDs have in common. The method comprises providing the third list of PLMN IDs to the subscriber entity for remote provision of the subscriber entity to one PLMN in the third list of PLMN IDs.

According to a seventh aspect there is presented a network server for enabling remote provision of a subscriber entity to a PLMN in a communications network. The network server comprises processing circuitry. The processing circuitry is configured to cause the network server to receive, from the subscriber entity, a first list of PLMN IDs in the communications network for which a signal quality criterion is fulfilled for the subscriber entity and a eUICC ID of the subscriber entity. The processing circuitry is configured to cause the network server to determine a second list of PLMN IDs based on the eUICC ID of the subscriber entity. The processing circuitry is configured to cause the network server to determine a third list of PLMN IDs consisting of those PLMN IDs the first list of PLMN IDs and the second list of PLMN IDs have in common. The processing circuitry is configured to cause the network server to provide the third list of PLMN IDs to the subscriber entity for remote provision of the subscriber entity to one PLMN in the third list of PLMN IDs.

According to an eighth aspect there is presented a network server for enabling remote provision of a subscriber entity to a PLMN in a communications network. The network server comprises processing circuitry and a computer program product. The computer program product storing instructions that, when executed by the processing circuitry, cause the network server to perform steps, or operations. The steps, or operations, cause the network server to receive, from the subscriber entity, a first list of PLMN IDs in the communications network for which a signal quality criterion is fulfilled for the subscriber entity and a eUICC ID of the subscriber entity. The steps, or operations, cause the network server to determine a second list of PLMN IDs based on the eUICC ID of the subscriber entity. The steps, or operations, cause the network server to determine a third list of PLMN IDs consisting of those PLMN IDs the first list of PLMN IDs and the second list of PLMN IDs have in common. The steps, or operations, cause the network server to provide the third list of PLMN IDs to the subscriber entity for remote provision of the subscriber entity to one PLMN in the third list of PLMN IDs.

According to a ninth aspect there is presented a network server for enabling remote provision of a subscriber entity to a PLMN in a communications network. The network server comprises a receive module configured to receive, from the subscriber entity, a first list of PLMN IDs in the communications network for which a signal quality criterion is fulfilled for the subscriber entity and a eUICC ID of the subscriber entity. The network server comprises a determine module configured to determine a second list of PLMN IDs based on the eUICC ID of the subscriber entity. The network server comprises a determine module configured to determine a third list of PLMN IDs consisting of those PLMN IDs the first list of PLMN IDs and the second list of PLMN IDs have in common. The network server comprises a provide module configured to provide the third list of PLMN IDs to the subscriber entity for remote provision of the subscriber entity to one PLMN in the third list of PLMN IDs.

According to a tenth aspect there is presented a computer program for enabling remote provision of a subscriber entity o a PLMN in a communications network, the computer program comprising computer program code which, when run on processing circuitry of a network server, causes the network server to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these subscriber entities, these network servers, and these computer programs provide efficient remote provision of the subscriber entity.

Advantageously this in turn enables efficient localization of the subscriber entity to the PLMN.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
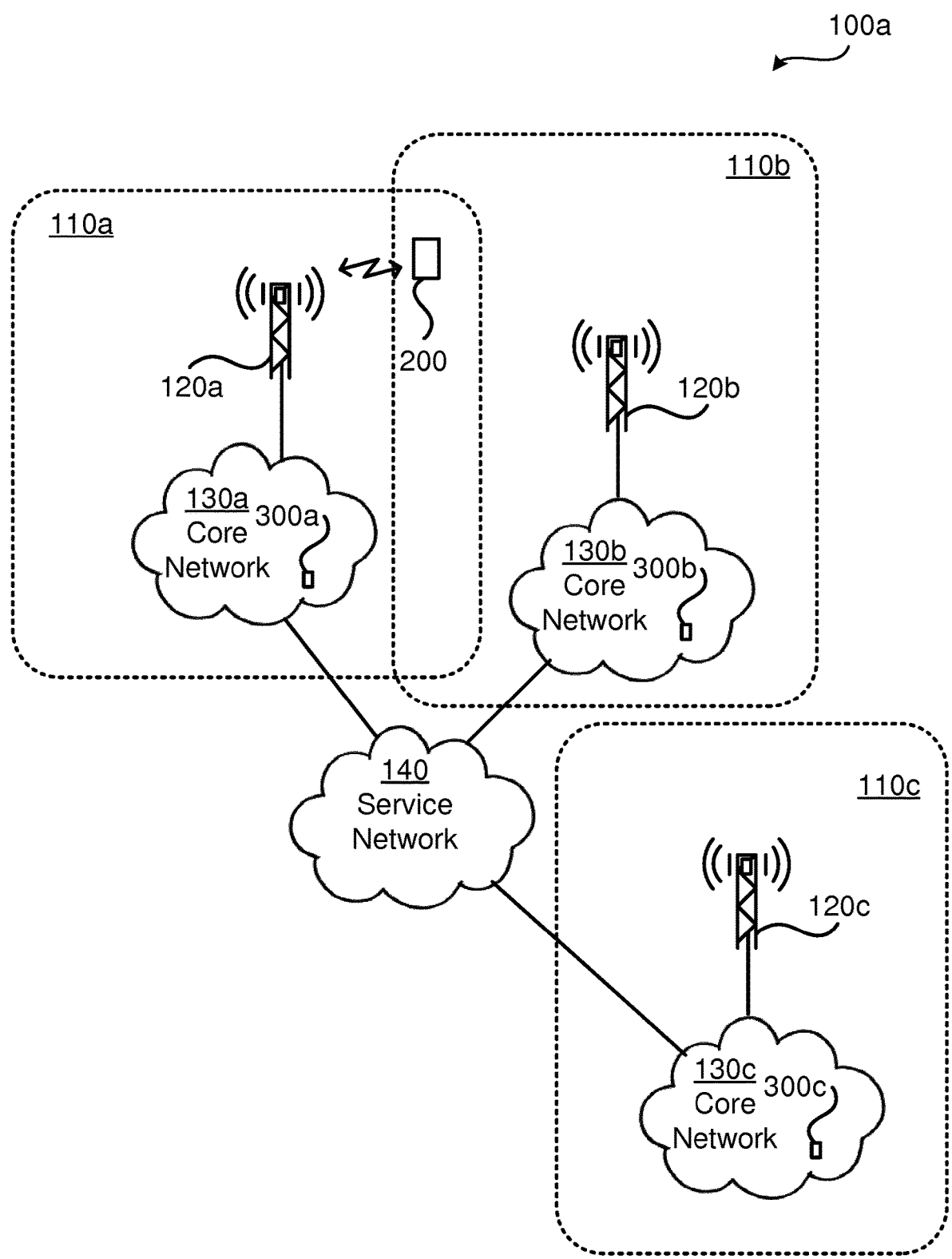
FIGS. 1 and 6 are schematic diagrams illustrating a communication network according to embodiments.

FIG. 1 is a schematic simplified diagram of a communications network 100a where embodiments presented herein can be applied. The communications network 100a comprises at least two PLMNs 110a, 110b, 110c. Each PLMN is associated with its own MNO. In turn, each PLMN 110a, 110b, 110c comprises a radio access network (defined by a radio access network node 120a, 120b, 120c, such as a radio base station) and a core network 130a, 130b, 130c. The core networks 130a, 130b, 130c operatively connects the radio access network 120a, 120b, 120c with a packet based service network 140. A subscriber entity 200 operatively connected to one of the PLMNs 110a, 110b, 110c (in FIG. 1 indicated to be operatively connected to PLMN 110a via radio access network node 120a) is thereby enabled to access services and exchange data with the service network 140. In order to do so the subscriber entity 200 needs to be localized in the communications network 100a, and hence be provisioned by a network server 300a, 300b, 300c. A description of the operations performed by the network server 300a, 300b, 300c will be provided below. The subscriber entity 200 could be a SIM or an eSIM. Further, the subscriber entity 200 could be a communications device. As the skilled person understands, although the schematic illustration of FIG. 1 only depicts three PLMNs 110a, 110b, 110c, the communications network 100a generally comprises a plurality of PLMNs 110a, 110b, 110c. Further, the at least two PLMNs 110a, 110b, 110c may be overlapping (either completely or partly) in the communications network 100a. Hence, in some parts of the communications network 100a network access can be provided by a single PLMN 110a, 110b, 110c, in some parts of the communications network 100a network access can be provided by two or more PLMN 110a, 110b, 110c, and in some parts of the communications network 100a network access may not be provided by any PLMN.

According to existing mechanisms for eSIM localization, when the connected device (using eSIM) moves to a new country, the device selects a local operator (MNO) based on one of two options: a first option is based on operator network signal strength, and a second option is based on eSIM subscription contract in the new country.

In view of the first option, the selected operator may not have an available eSIM profile on its BSS/HLR to provision to network, and/or the selected operator may not have an available eSIM profile on SM-DP to download to eUICC. Hence, instead of localization the device will be roaming. In view of the second option the operator selected based on a country contract may not have connectivity coverage in the specific geographic location in which the device is located. Hence the device will not find any connection. Connectivity failure is therefore a likely result of both the first option and the second option.

Known mechanism for localization of a subscriber entity 200 may thus result in that the device carrying the subscriber entity 200 will not find any connection and that connectivity failure therefore a likely result. Hence, there is still a need for improved localization of a subscriber entity 200.

In order to obtain mechanisms for remote provision of the subscriber entity 200 to a PLMN in a communications network 100a there is provided a subscriber entity 200, a method performed by the subscriber entity 200, a computer program product comprising code, for example in the form of a computer program, that when run on processing circuitry of the subscriber entity 200, causes the subscriber entity 200 to perform the method. In order to obtain mechanisms for remote provision of the subscriber entity 200 to a PLMN in a communications network 100a, there is further provided a network server 300a, 300b, 300c, a method performed by the network server 300a, 300b, 300c, and a computer program product comprising code, for example in the form of a computer program, that when run on processing circuitry of the network server 300a, 300b, 300c, causes the network server 300a, 300b, 300c to perform the method.

Figure 2:
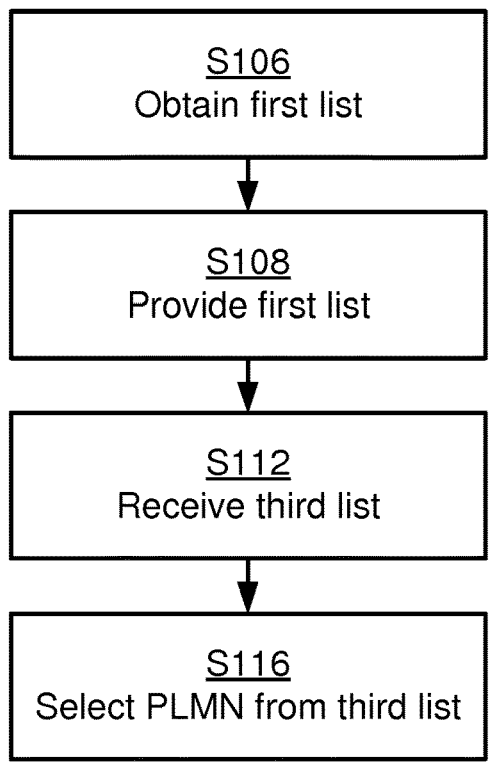
FIGS. 2, 3, 4, and 5 are flowcharts of methods according to embodiments.
Figure 3:
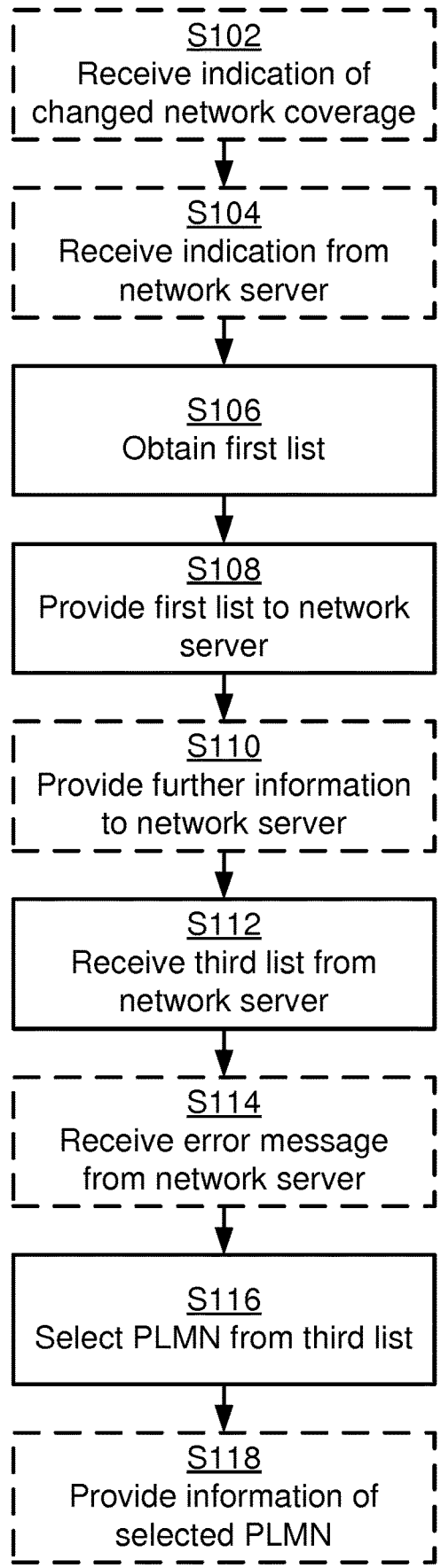
Figure 4:
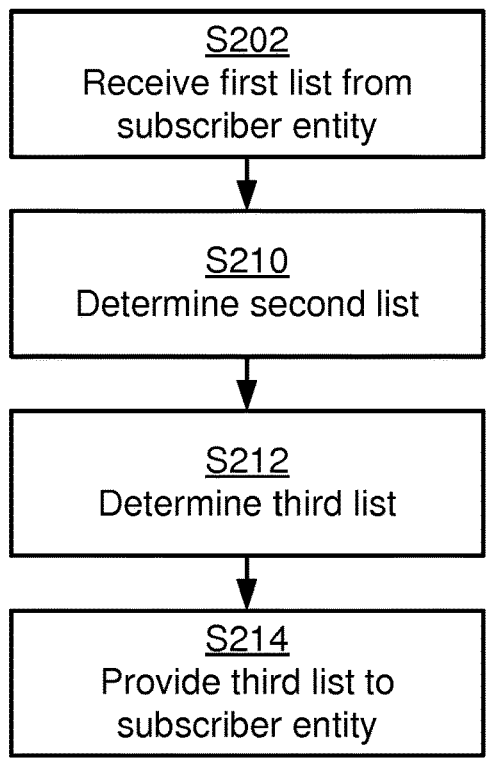
Figure 5:
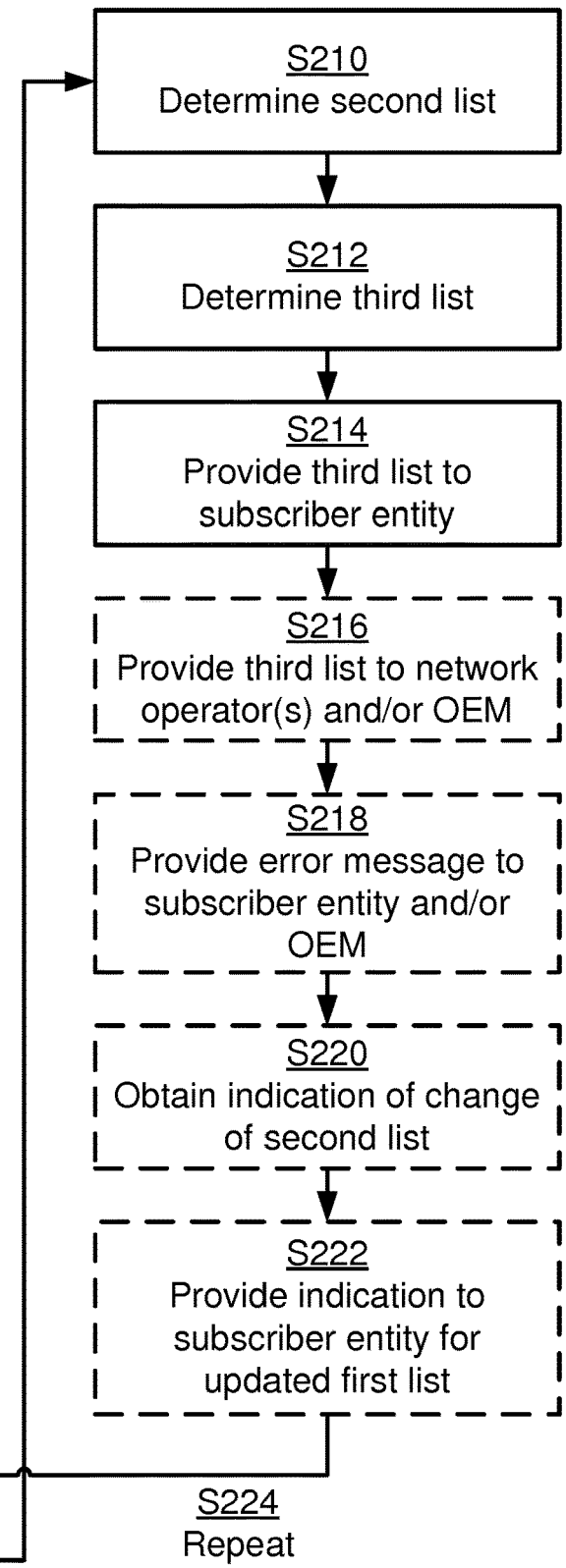

FIGS. 2 and 3 are flow charts illustrating embodiments of methods for remote provision of the subscriber entity 200 to a PLMN in a communications network 100a as performed by the subscriber entity 200. FIGS. 4 and 5 are flow charts illustrating embodiments of methods for enabling remote provision of the subscriber entity 200 to a PLMN in a communications network 100a as performed by the network server 300a, 300b, 300c. The methods are advantageously provided as computer programs 420a, 420b.

Reference is now made to FIG. 2 illustrating a method for remote provision of the subscriber entity 200 to a PLMN in a communications network 100a as performed by the subscriber entity 200 according to an embodiment.

S106: The subscriber entity 200 obtains a first list of PLMN IDs in the communications network 100a for which a signal quality criterion is fulfilled. That is, the first list of PLMN identifies those PLMNs in the communications network 100a for which a signal quality criterion is fulfilled. Examples of the signal quality criterion being fulfilled include, but are not limited to, a signal to noise ratio being higher than a first predetermined threshold value, a bit error rate being lower than a second predetermined threshold value, and a Quality of Service value being higher than a third predetermined threshold value. In this respect, according to an embodiment the signal quality criterion for a given PLMN ID needs to be fulfilled during a time interval preceding the step of providing the first list for the PLMN ID (see step S108 below) in order for that given PLMN ID to be entered on the first list of PLMN IDs. This embodiment would remove snapshot effect which could otherwise affect which PLMN IDs that are entered on the first list for the PLMN ID. In order to obtain the first list of PLMN IDs the subscriber entity 200 can establish a roaming connection to the communications network 100a. Hence, according to an embodiment the first list of PLMN IDs is provided via a roaming connection of the subscriber entity. The first list of PLMN IDs is provided to the network server 300a, 300b, 300c. Hence, the subscriber entity 200 is configured to perform step S108:

S108: The subscriber entity 200 provides the first list of PLMN IDs and the eUICC ID of the subscriber entity 200 to the network server 300a, 300b, 300c.

The first list of PLMN IDs and the eUICC ID of the subscriber entity 200 is together with a second list of PLMN IDs by the network server 300a, 300b, 300c used to determine a third list of PLMN IDs. This third list of PLMN IDs is provided to the subscriber entity 200. Hence, the subscriber entity 200 is configured to perform step S112:

S112: The subscriber entity 200 receives the third list of PLMN IDs from the network server 300a, 300b, 300c. The third list of PLMN IDs is based on the first list of PLMN IDs.

The third list of PLMN IDs define one or more PLMNs (if the third list of PLMN IDs is a non-empty list) to which the subscriber entity 200 can establish a connection. Hence, the subscriber entity 200 is configured to perform step S116:

S116: The subscriber entity 200 selects, when the third list of PLMN IDs is a non-empty list, one PLMN from the third list of PLMN IDs to remotely provision the subscriber entity 200.

Since the network server 300a, 300b, 300c uses the first list of PLMN IDs, the eUICC ID of the subscriber entity 200, and the second list of PLMN IDs to determine the third list of PLMN IDs, according to an embodiment the third list of PLMN IDs as received in step S112 is based on the second list of PLMN IDs as determined by the network server 300a, 300b, 300c, and/or on the eUICC ID of the subscriber entity 200.

Embodiments relating to further details of remote provision of the subscriber entity 200 will now be disclosed.

Reference is now made to FIG. 3 illustrating methods for remote provision of the subscriber entity 200 to a PLMN in a communications network 100a as performed by the subscriber entity 200 according to further embodiments. It is assumed that steps S106, S108, S112, and S116 are performed as described with reference to FIG. 2 and a thus repeated description thereof is therefore omitted.

There may be different scenarios relating to when the subscriber entity 200 is to obtain a first list of PLMN IDs in the communications network 100a as in step S106.

According to some aspects, the subscriber entity 200 (re-)starts a matching procedure whenever the network coverage situation changes. Hence, according to an embodiment the subscriber entity 200 is configured to perform step S102:

S102: The subscriber entity 200 receives an indication of changed network coverage. The first list of PLMN IDs is then by the subscriber entity 200 obtained in response thereto. Hence, according to this embodiment step S102 acts as a trigger for the subscriber entity 200 to perform step S106.

According to some aspects, when the second list of PLMN IDs is changed, the network server 300a, 300b, 300c could send a notification to yen subscriber entity 200 so that the subscriber entity 200 can restart the matching procedure. Hence, according to an embodiment the subscriber entity 200 is configured to perform step S104:

S104: The subscriber entity 200 receives an indication from the network server 300a, 300b, 300c to obtain the first list of PLMN IDs. The first list of PLMN IDs is then by the subscriber entity 200 obtained in response thereto. Hence, according to this embodiment step S104 acts as a trigger for the subscriber entity 200 to perform step S106.

According to some aspects, the subscriber entity 200 provides further information on which the third list of PLMN IDs is based to the network server 300a, 300b, 300c. Examples of such further information include, but are not limited to, geographical location, sensor input, speed, temperature, and altitude, as obtained by the subscriber entity 200. Hence, according to an embodiment the subscriber entity 200 is configured to perform step S110:

S110: The subscriber entity 200 provides the further information of the subscriber entity 200 to the network server 300a, 300b, 300c. The third list of PLMN IDs is then also based on the further information.

As disclosed above, the subscriber entity 200 in step S116 selects one PLMN from the third list of PLMN IDs to remotely provision the subscriber entity 200 when the third list of PLMN IDs is a non-empty list. According to some aspects the subscriber entity 200 shares which profile/PLMN ID that was in the end selected by the subscriber identity 200 with at least one other entity. Hence, according to an embodiment the subscriber entity 200 is configured to perform step S118 after having performed step S116:

S118: The subscriber entity 200 provides information of the selected one PLMN from the third list of PLMN IDs to at least one of the network server 300a, 300b, 300c and the OEM of the eUICC.

According to some aspect the third list of PLMN IDs is an empty list. The subscriber entity 200 could then receive a message from the network server 300a, 300b, 300c. Hence, according to an embodiment the subscriber entity 200 is configured to perform step S114 when the third list of PLMN IDs is an empty list:

S114: The subscriber entity 200 receives an error message from the network server 300a, 300b, 300c. The error message could indicate that there is not any available PLMN for the subscriber entity 200 to select.

Reference is now made to FIG. 4 illustrating a method for enabling remote provision of the subscriber entity 200 to a PLMN in a communications network 100a as performed by the network server 300a, 300b, 300c according to an embodiment.

As disclosed above the subscriber entity 200 in step S108 provides a first list of PLMN IDs and the eUICC ID of the subscriber entity 200 to the network server 300a, 300b, 300c. Hence, the network server 300a, 300b, 300c is configured to perform step S202:

S202: The network server 300a, 300b, 300c receives, from the subscriber entity 200, a first list of PLMN IDs in the communications network 100a for which a signal quality criterion is fulfilled for the subscriber entity 100a and the eUICC ID of the subscriber entity 200.

The received information is by the network server 300a, 300b, 300c used to determine a third list of PLMN IDs. In order to do so the network server 300a, 300b, 300c determines a second list of PLMN IDs. Hence, the network server 300a, 300b, 300c is configured to perform step S210:

S210: The network server 300a, 300b, 300c determines a second list of PLMN IDs based on the eUICC ID of the subscriber entity 200. The second list of PLMN IDs comprises those PLMNs with which the eUICC has a network service agreement with. As will be further disclosed below, the eUICC ID can by the network server 300a, 300b, 300c be used to obtain eUICC information for the subscriber entity 200.

The network server 300a, 300b, 300c then determines the third list of PLMN IDs. Hence, the network server 300a, 300b, 300c is configured to perform step S212:

S212: The network server 300a, 300b, 300c determines a third list of PLMN IDs. The third list of PLMN IDs consists of those PLMN IDs the first list of PLMN IDs and the second list of PLMN IDs have in common. Hence, assuming that each of the first list of PLMN IDs, the second list of PLMN IDs, and the third list of PLMN IDs can be represented as respective sets, the third list of PLMN IDs can be regarded as the set-theoretic intersection of the first list of PLMN IDs and the second list of PLMN IDs.

S214: The network server 300a, 300b, 300c provides the third list of PLMN IDs to the subscriber entity 200 for remote provision of the subscriber entity 200 to one PLMN in the third list of PLMN IDs.

Embodiments relating to further details of enabling remote provision of the subscriber entity 200 will now be disclosed.

Reference is now made to FIG. 5 illustrating methods for enabling remote provision of the subscriber entity 200 to a PLMN in a communications network 100a as performed by the network server 300a, 300b, 300c according to further embodiments. It is assumed that steps S202, S210, S212, S214 are performed as described with reference to FIG. 4 and a thus repeated description thereof is therefore omitted.

As disclosed above, the subscriber entity 200 in step S110 provides further information of the subscriber entity 200 to the network server 300a, 300b, 300c based on which the third list of PLMN IDs is then based. Hence, according to an embodiment the network server 300a, 300b, 300c is configured to perform step S204:

S204: The network server 300a, 300b, 300c receives further information of the subscriber entity 200 from the subscriber entity 200. The second list of PLMN IDs is then based on the further information of the subscriber entity 200. Examples of such further information have been disclosed above. For example, information such as geographical location, sensor input, speed, temperature, altitude, vehicle navigation route (assuming that the subscriber entity 200 is part of, or at least associated with, a vehicle), humidity, and/or identification of whether the subscriber entity 200 currently is located in an urban area or in a rural area, could by the network server 300a, 300b, 300c be used to add and/or remove PLMNs from the second list of PLMN IDs. For example, if the network server 300a, 300b, 300c has access to information that the subscriber entity 200 is located at a given geographical location, the network server 300a, 300b, 300c may for the second list of PLMN IDs only consider those PLMNs that have provide network coverage in this given geographical location. For example, if the network server 300a, 300b, 300c has access to information that the subscriber entity 200 is located at an altitude below sea level, this could indicate that the subscriber entity 200 is entering a mine (or another sub-sea level location). The network server 300a, 300b, 300c may then for the second list of PLMN IDs only consider those PLMNs that provide network coverage in the specific mine (or sub-sea level location). For example, if the network server 300a, 300b, 300c has access to information that the subscriber entity 200 is located at a specific floor in a specific building, the network server 300a, 300b, 300c may then for the second list of PLMN IDs only consider those PLMNs that provide network coverage at this specific floor in this specific building. In any of the above examples the determination of the second list of PLMN IDs could be combined with location information of the subscriber entity 200 for better accuracy.

As disclosed above, the eUICC ID can by the network server 300a, 300b, 300c be used to obtain eUICC information for the subscriber entity 200. Hence, according to an embodiment the network server 300a, 300b, 300c is configured to perform step S206:

S206: The network server 300a, 300b, 300c obtains eUICC information for the subscriber entity 200 by using the eUICC ID. The second list of PLMN IDs is then based also on the eUICC information. There can be different examples of eUICC information. In an embodiment the eUICC information identifies which at least one network operator the eUICC has a network service agreement with. Further, in an embodiment the eUICC information comprises at least one of OEM information, eUICC specification, eUICC type, and eUICC vendor information.

The eUICC information for the subscriber entity 200 can by the network server 300a, 300b, 300c be used to obtain available operator profiles for the subscriber entity 200. Hence, according to an embodiment the network server 300a, 300b, 300c is configured to perform step S208:

S208: The network server 300a, 300b, 300c obtains at least one network operator profile for the subscriber entity 200 by using the eUICC information The second list of PLMN IDs is then based also on the at least one network operator profile.

The at least one network operator profile could specify a software profile to be downloaded to the eUICC for provisioning of the subscriber entity 200. There could be different network entities from which the at least one network operator profile is obtained. For example, the at least one network operator profile could by the network server 300a, 300b, 300c be obtained from an SM-DP node, a BSS, or a HLR of the subscriber entity 200.

In addition to providing the third list of PLMN IDs to the subscriber entity 200, as in step S214, the network server 300a, 300b, 300c in some aspects provide the third list of PLMN IDs also to other entities. Hence, according to an embodiment the network server 300a, 300b, 300c is configured to perform step S216:

S216: The network server 300a, 300b, 300c provides the third list of PLMN IDs to at least one network operator identified by the first, second, or third list of PLMN IDs, and/or the OEM of the eUICC. Hence, the third list of PLMN IDs can be provided to network operators and/or the OEM of the eUICC. This could help the network operators to improve their network coverage and the OEM of the eUICC to improve its network service agreements.

As noted above, the third list of PLMN IDs could be an empty list. Hence, according to an embodiment the network server 300a, 300b, 300c is configured to perform step S218 when the third list of PLMN IDs is an empty list:

S218: The network server 300a, 300b, 300c provides an error message to at least one of the subscriber entity 200, at least one network operator identified by the first or second list of PLMN IDs, and the OEM of the eUICC. This could help the OEM of the eUICC to improve its network service agreements.

There could be situations when the remote provision of the subscriber entity 200 is to be repeated. Such a repetition can be needed, for example, when there is a change in the second list of PLMN IDs. Hence, according to an embodiment the network server 300a, 300b, 300c is configured to perform step S220:

S220: The network server 300a, 300b, 300c obtains an indication of change in the second list of PLMN IDs. The change results in an updated second list of PLMN IDs.

The fact that the second list of PLMN IDs is updated into the updated second list of PLMN IDs may result in that the intersection between the first list of PLMN IDs and the updated second list of PLMN IDs is different from the intersection between the first list of PLMN IDs and the (original) second list of PLMN IDs and thus that an updated third list of PLMN IDs needs to be determined. The updated second list of PLMN IDs can be a result of the OEM of the subscriber entity 200 having renegotiated a network service agreement with one or more MNOs.

Further, this updated third list of PLMN IDs should be based on a current first list of PLMN IDs since the subscriber entity 200 may have moved since having obtained the (original) first list of PLMN IDs. That is, when second list of PLMN IDs is changed, the network server 300a, 300b, 300c could send a notification to the subscriber entity 200 so that the subscriber entity 200 can restart its matching procedure.

Hence, according to an embodiment the network server 300a, 300b, 300c is configured to perform step S222 in response to having performed step S220:

S222: The network server 300a, 300b, 300c provides an indication to the subscriber entity 200 to provide an updated first list of PLMN IDs. This indication is received in step S104.

The network server 300a, 300b, 300c then repeats at least steps S202, S212, and S214 for the respective updated lists of PLMN IDs. Hence, according to an embodiment the network server 300a, 300b, 300c is configured to perform step S224:

S224: The network server 300a, 300b, 300c repeats the step S202 of receiving the first list, the step S212 of determining the third list, and the step S214 of providing the third list but for the updated first list of PLMN IDs and the updated second list of PLMN IDs.

As disclosed above, the subscriber entity 200 may also restart the matching procedure when the network coverage situation changes, since this could indicate that the first list of PLMN IDs is changed. Hence, in summary, whenever there is change in either the first list of PLMN IDs or the second list of PLMN IDs, the above disclosed matching procedure (as defined by steps S106, S108, S112, S116, and S202, S210, S212, S214) can be triggered again.

Table 1 summarizes some properties of the first, second, and third list of PLMN IDs as herein defined.

TABLE 1

Summary of PLMN ID lists.

| PLMN ID list | Generator of list | Factors on which list is based |
| --- | --- | --- |
| First list | eSIM Hub Client on device/eUICC | Available PLMN IDs in a specific geographical location in new country based on signal strength. |
| Second list | eSIM Hub Server | Based input from OEM and operators |
| Third list | eSIM Hub Server | Derived from First and Second lists. |

Figure 6:
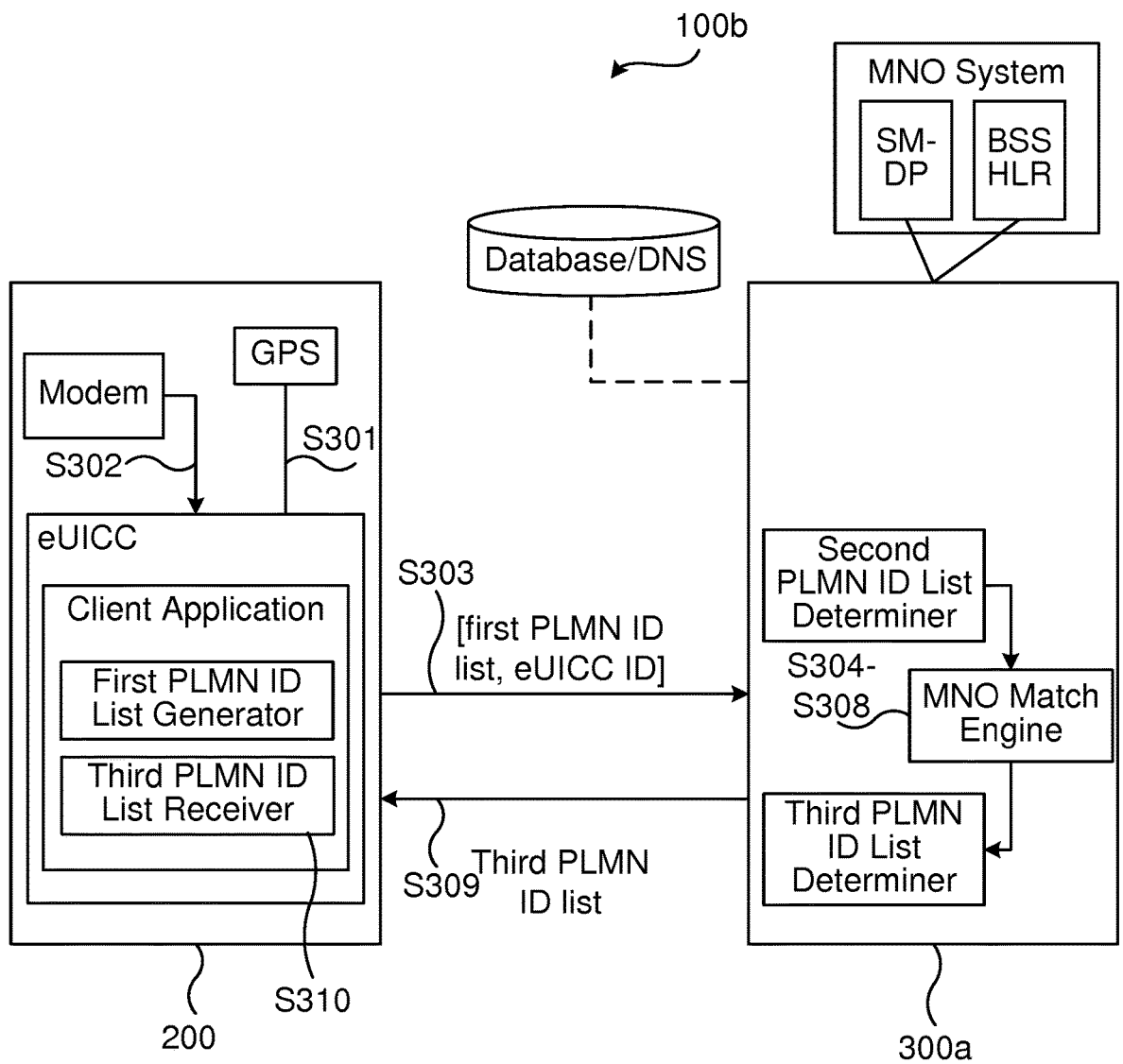

One particular embodiment for (enabling) remote provision of the subscriber entity 200 to a PLMN in a communications network 100a as performed by the subscriber entity 200 and the network server 300a, 300b, 300c based on at least some of the above disclosed embodiments will now be disclosed in detail. Reference is made to FIG. 6 schematically illustrating a communications network 100b. The communications network 100b could represent a part of the communications network 100a of FIG. 1.

The subscriber entity 200 comprises an eUICC, a radio modem and a GPS entity. The modem is configured to perform signaling strength scanning, and to report available network PLMN IDs to a client application. The GPS entity is configured to obtain a current geographical location of the subscriber entity 200, and to report the current geographical location to the client application. The eUICC runs the client application. The client application is, for example, responsible for selecting a new PLMN, reporting to the network server 300a, 300b, 300c via a roaming connection, generating the first list of PLMN IDs and sending it to the network server 300a, 300b, 300c together with eUICC ID, and receiving the third list of PLMN IDs from the network server 300a, 300b, 300c.

The network server 300a comprises a list determiner configured to determine the second list of PLMN IDs. The network server 300a comprises an MNO match engine configured to match the first list of PLMN IDs and the second list of PLMN IDs. The network server 300a comprises a list determiner configured to determine the third list of PLMN IDs based on input from the MNO match engine, and provide the third list of PLMN IDs to the subscriber entity 200.

A database and/or DNS system could be either an internal system within network server 300a, or external to the network server 300a. The database and/or DNS system comprises information such as OEM information, eUICC specification/type/vendor/version, device capability, etc.

A MNO system comprises profiles (SM-DP, BSS, HLR).

S301: The subscriber entity 200 is moved from its home country into a new country and attaches to a network operator via a roaming connection. The subscriber entity 200 thus receives an indication of changed network coverage. One way to implement step S301 is to perform step S102.

S302: The subscriber entity 200 obtains available PLMN IDs for which the signal strength fulfills a quality criterion and combines all such PLMN IDs in a first list of PLMN IDs. One way to implement step S302 is to perform step S106.

S303: The subscriber entity 200 reports [first list of PLMN IDs, eUICC ID] to the network server 300a, 300b, 300c via the roaming connection. Optionally, the subscriber entity 200 provides further information (as specified above) GPS coordinates to the network server 300a, 300b, 300c, to facilitate enhanced operator selection. One way to implement step S303 is to perform step S108 and optionally step S110.

S304: The network server 300a, 300b, 300c receives [first list of PLMN IDs, eUICC ID] provided by the subscriber entity 200 via the roaming connection. Optionally, the network server 300a, 300b, 300c obtains further information (if provided by the subscriber entity 200). One way to implement step S304 is to perform step S202 and optionally step S204.

S305: The network server 300a, 300b, 300c retrieves eUICC information (such as OEM information, eUICC specification and eUICC type, vendor) by using the eUICC ID from a pre-populated (internal or external) database and/or DNS system. One way to implement step S305 is to perform step S206.

S306: The network server 300a, 300b, 300c retrieves available operator profiles based on the retrieves eUICC information from an operator system (such as any of SM-DP, BSS, HLR) of the country in which the subscriber entity 200 is located when obtaining the available PLMN IDs in step S302. One way to implement step S306 is to perform step S208.

S307: The network server 300a, 300b, 300c derives a second PLMN ID list from the retrieved operator profiles. One way to implement step S307 is to perform step S210.

S308: The network server 300a, 300b, 300c compares the second list of PLMN IDs with the first list of PLMN IDs, and finds the common PLMN ID(s), and gathers the common PLMN ID(s) into the third list of PLMN IDs. One way to implement step S308 is to perform step S212.

S309: The network server 300a, 300b, 300c provides the third list of PLMN IDs to the subscriber entity 200. One way to implement step S309 is to perform step S214.

S310: The subscriber entity 200 receives the third list of PLMN IDs and selects one PLMN in the third list of PLMN IDs to further localize, and thus provision, the subscriber entity 200 to the selected PLMN. One way to implement step S310 is to perform step S112 and step S116.

Figure 7:
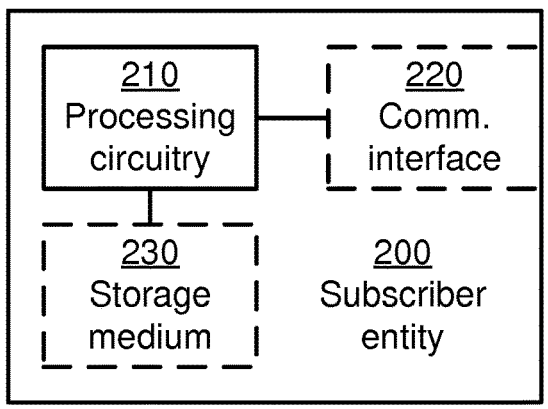
FIG. 7 is a schematic diagram showing functional units of a subscriber entity 200 according to an embodiment.

FIG. 7 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, S102-S116, as disclosed above. For example, the storage medium 230 may store the set of operations, and the processing circuitry 210 may be configured to retrieve the set of operations from the storage medium 230 to cause the subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications at least with a network server 300a, 300b, 300c. As such the communications interface 220 may comprise one or more transmitters and receivers, comprising analogue and digital components and a suitable number of antennas for wireless communications and ports for wireline communications.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 8:
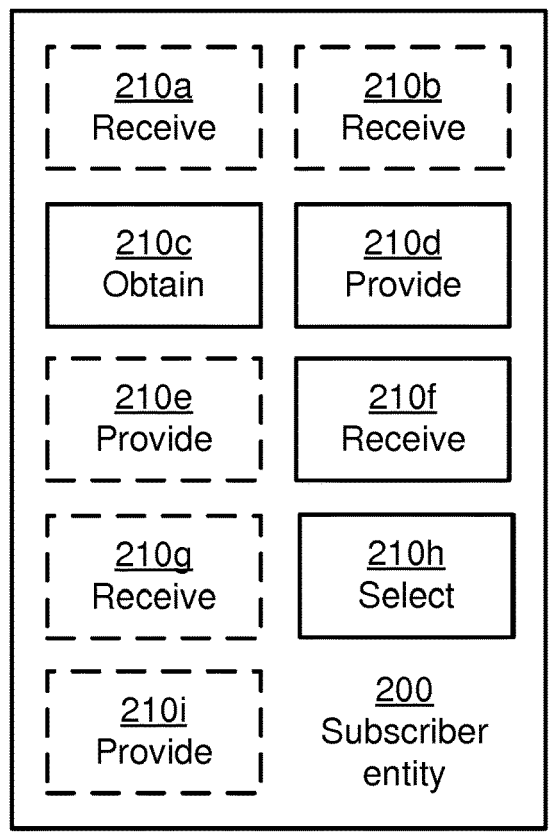
FIG. 8 is a schematic diagram showing functional modules of a subscriber entity 200 according to an embodiment.

FIG. 8 schematically illustrates, in terms of a number of functional modules, the components of a subscriber entity 200 according to an embodiment. The subscriber entity 200 of FIG. 8 comprises a number of functional modules; an obtain module 210c configured to perform step S106, a provide module 210d configured to perform step S108, a receive module 210f configured to perform step S112, and a select module 210h configured to perform step S116. The subscriber entity 200 of FIG. 8 may further comprise a number of optional functional modules, such as any of a receive module 210a configured to perform step S102, a receive module 210b configured to perform step S104, a provide module 210e configured to perform step S110, a receive module 210g configured to perform step S114, and a provide module 210i configured to perform step S118.

In general terms, each functional module 210a-210i may be implemented in hardware or in software. Preferably, one or more or all functional modules 210a-210i may be implemented by the processing circuitry 210, possibly in cooperation with functional units 220 and/or 230. The processing circuitry 210 may thus be arranged to from the storage medium 230 fetch instructions as provided by a functional module 210a-210i and to execute these instructions, thereby performing any steps of the subscriber entity 200 as disclosed herein.

The subscriber entity 200 may be provided as a standalone device or as a part of at least one further device. For example the subscriber entity 200 may be provided in, or be part of, a SIM, an eSIM or a communications device.

Figure 9:
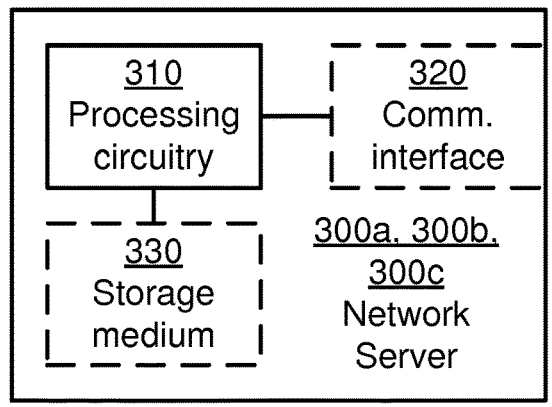
FIG. 9 is a schematic diagram showing functional units of a network server 300*a*, 300*b*, 300*c* according to an embodiment.

FIG. 9 schematically illustrates, in terms of a number of functional units, the components of a network server 300a, 300b, 300c according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 11), e.g. in the form of a storage medium 330o. The processing circuitry 310 may further be provided as at least one application specific integrated circuit (ASIC), or field programmable gate array (FPGA).

Particularly, the processing circuitry 310 is configured to cause the network server 300a, 300b, 300c to perform a set of operations, or steps, S202-S224, as disclosed above. For example, the storage medium 330 may store the set of operations, and the processing circuitry 310 may be configured to retrieve the set of operations from the storage medium 330 to cause the network server 300a, 300b, 300c to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network server 300a, 300b, 300c may further comprise a communications interface 320 for communications at least with a subscriber entity 200. As such the communications interface 320 may comprise one or more transmitters and receivers, comprising analogue and digital components and a suitable number of antennas for wireless communications and ports for wireline communications.

The processing circuitry 310 controls the general operation of the network server 300a, 300b, 300c e.g. by sending data and control signals to the communications interface 320 and the storage medium 330, by receiving data and reports from the communications interface 320, and by retrieving data and instructions from the storage medium 330. Other components, as well as the related functionality, of the network server 300a, 300b, 300c are omitted in order not to obscure the concepts presented herein.

Figure 10:
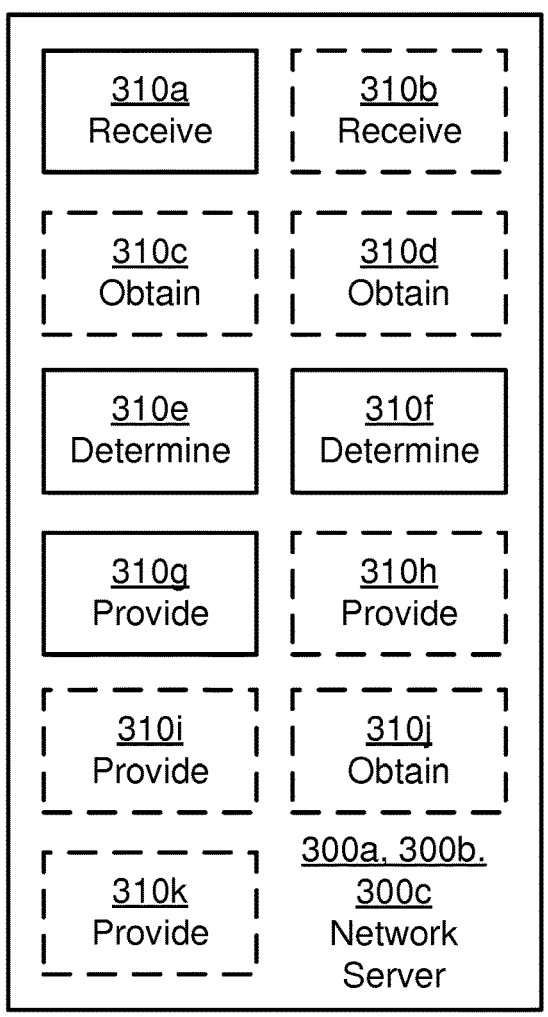
FIG. 10 is a schematic diagram showing functional modules of a network server 300*a*, 300*b*, 300*c* according to an embodiment.

FIG. 10 schematically illustrates, in terms of a number of functional modules, the components of a network server 300a, 300b, 300c according to an embodiment. The network server 300a, 300b, 300c of FIG. 10 comprises a number of functional modules; a receive module 310a configured to perform step S202, a determine module 310e configured to perform step S210, a determine module 310f configured to perform step S212, and a provide module 310g configured to perform step S214. The network server 300a, 300b, 300c of FIG. 10 may further comprises a number of optional functional modules, such as any of a receive module 310b configured to perform step S204, an obtain module 310c configured to perform step S206, an obtain module 310d configured to perform step S208, a provide module 310h configured to perform step S216, a provide module 310i configured to perform step S218, an obtain module 310j configured to perform step S220, and a provide module 310k configured to perform step S222.

In general terms, each functional module 310a-310k may be implemented in hardware or in software. Preferably, one or more or all functional modules 310a-310k may be implemented by the processing circuitry 310, possibly in cooperation with functional units 320 and/or 330. The processing circuitry 310 may thus be arranged to from the storage medium 330 fetch instructions as provided by a functional module 310a-310k and to execute these instructions, thereby performing any steps of the network server 300a, 300b, 300c as disclosed herein.

The network server 300a, 300b, 300c may be provided as a standalone device or as a part of at least one further device. For example, the network server 300a, 300b, 300c may be provided in a node of the core network. Alternatively, functionality of the subscriber entity 200 may be distributed between at least two devices, or nodes. Thus, a first portion of the instructions performed by the network server 300a, 300b, 300c may be executed in a first device, and a second portion of the of the instructions performed by the network server 300a, 300b, 300c may be executed in a second device; the herein disclosed embodiments are not limited to any particular number of devices on which the instructions performed by the network server 300a, 300b, 300c may be executed. Hence, the methods according to the herein disclosed embodiments are suitable to be performed by a network server 300a, 300b, 300c residing in a cloud computational environment.

Further, although a single processing circuitry 310 is illustrated in FIGS. 7 and 9 the processing circuitry 210, 310 may be distributed among a plurality of devices, or nodes. The same applies to the functional modules 210a-210i, 310a-310k of FIGS. 8 and 10 and the computer programs 420a, 420b of FIG. 11 (see below).

Figure 11:
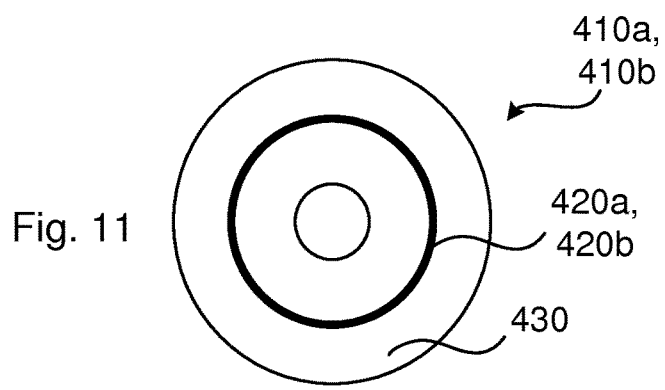
FIG. 11 shows one example of a computer program product comprising computer readable means according to an embodiment.

FIG. 11 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the subscriber entity 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the network server 300a, 300b, 300c as herein disclosed.

In the example of FIG. 11, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF ABBREVIATIONS

BSS: Business Support System
DNS: Domain Name System
eUICC: Embedded Universal Integrated Circuit Card
eSIM: Embedded SIM
GPS: Global Positioning System
GSM: Global System for Mobile communications
GSMA: GSM Association
HLR: Home Location Register
ID: Identity
IMSI: International Mobile Subscriber Identity
MNO: Mobile Network Operator
OEM: Original Equipment Manufacturer
PLMN: Public Land Mobile Network
SIM: Subscriber Identity Module
SM-DP: Subscription Management-Data Preparation
UICC: Universal Integrated Circuit Card

The invention claimed is:

1. A method for enabling remote provision of a subscriber entity to a Public Land Mobile Network (PLMN) in a communications network, the method being performed by a network server, the method comprising:
receiving, from the subscriber entity, a first list of PLMN identities (IDs) in the communications network for which a signal quality criterion is fulfilled for the subscriber entity and an Embedded Universal Integrated Circuit Card (eUICC) ID of the subscriber entity;
determining a second list of PLMN IDs based on the eUICC ID of the subscriber entity;
determining a third list of PLMN IDs consisting of those PLMN IDs the first list of PLMN IDs and the second list of PLMN IDs have in common; and
providing the third list of PLMN IDs to the subscriber entity for remote provision of the subscriber entity to one PLMN in the third list of PLMN IDs.

2. The method of claim 1, further comprising:
receiving further information of the subscriber entity from the subscriber entity, wherein the second list of PLMN IDs is based on the further information of the subscriber entity, and wherein the further information comprises at least one of geographical location, sensor input, speed, temperature, and altitude, obtained by the subscriber entity.

3. The method of claim 1, further comprising:
obtaining eUICC information for the subscriber entity by using the eUICC ID, and wherein the second list of PLMN IDs is based on the eUICC information.

4. The method of claim 3, wherein the eUICC information identifies which at least one network operator the eUICC has a network service agreement with.

5. The method of claim 1, further comprising, when the third list of PLMN IDs is an empty list:
providing an error message to at least one of the subscriber entity, at least one network operator identified by the first or second list of PLMN IDs, and an Original Equipment Manufacturer (OEM) of the eUICC.

6. The method of claim 1, further comprising obtaining an indication of change in the second list of PLMN IDs, the change resulting in an updated second list of PLMN IDs, and in response thereto:

providing an indication to the subscriber entity to provide an updated first list of PLMN IDs; and repeating the steps of receiving the first list, determining the third list and providing the third list but for the updated first list of PLMN IDs and the updated second list of PLMN IDs.

7. A network server for enabling remote provision of a subscriber entity to a Public Land Mobile Network (PLMN) in a communications network, the network server comprising:

processing circuitry; and a computer program product storing instructions that, when executed by the processing circuitry, causes the network server to:

receive, from the subscriber entity, a first list of PLMN identities (IDs) in the communications network for which a signal quality criterion is fulfilled for the subscriber entity and an Embedded Universal Integrated Circuit Card (eUICC) ID of the subscriber entity;

determine a second list of PLMN IDs based on the eUICC ID of the subscriber entity;

determine a third list of PLMN IDs consisting of those PLMN IDs the first list of PLMN IDs and the second list of PLMN IDs have in common; and provide the third list of PLMN IDs to the subscriber entity for remote provision of the subscriber entity to one PLMN in the third list of PLMN IDs.

\* \* \* \* \*